April 19, 1960
EMIL C. SZPAK
NOW BY JUDICIAL CHANGE OF NAME
EMIL C. SPAK
DRAW BAR
2,933,311
Filed May 14, 1958
2 Sheets-Sheet 2
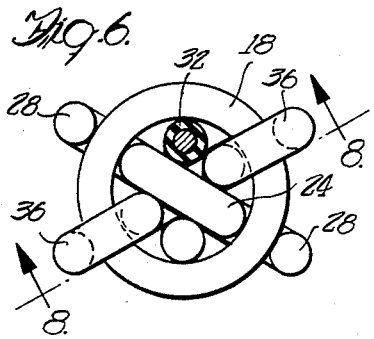
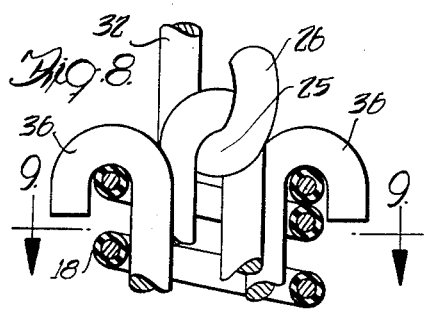
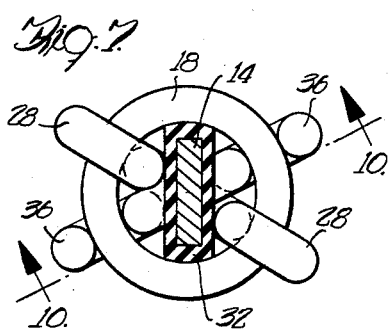
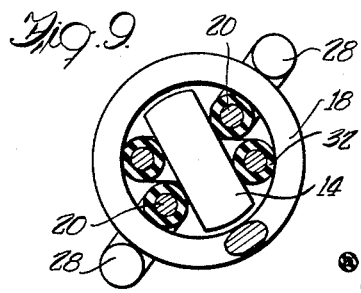
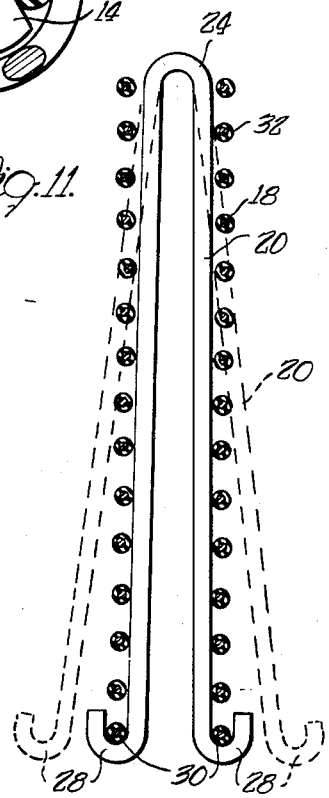
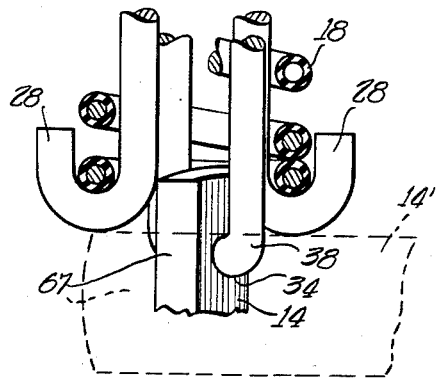
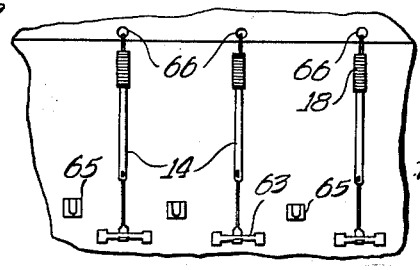
Inventor
Emil C. Spak
By Donald H. Sweet
Attorney

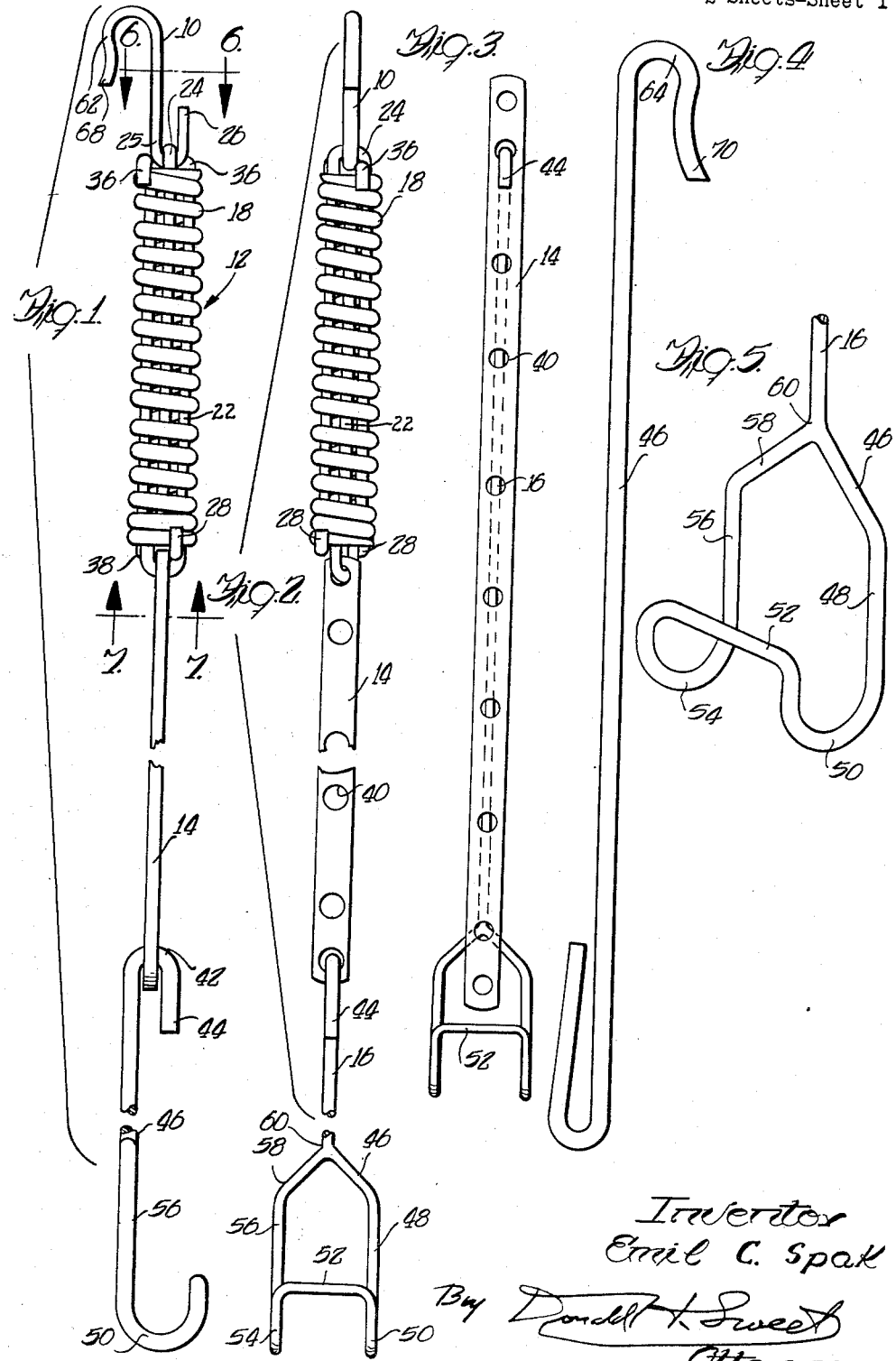

United States Patent Office 2,933,311
Patented Apr. 19, 1960

2,933,311

DRAW BAR

Emil C. Szpak, Elmwood Park, Ill., now by judicial change of name Emil C. Spak

Application May 14, 1958, Serial No. 735,292

9 Claims. (Cl. 267—72)

My invention relates to transportation and is directed in the first instance to increased safety and dependability in transporting goods and merchandise of all sorts by truck, or trailer truck, with a tarpaulin or the like protecting the shipment from injury.

A truck body with an open top presents a maximum of adaptability and safety for the contents, as well as convenience in putting the load in place because heavy pieces can be picked up on a small crane and lowered gently into place after the truck body has been backed under them. The main obstacle to the use of such trucks has been difficulty in providing a weather-proof covering that is easy to install and effectively weather-proof and dependable when subjected to strong winds or the like. The well known tarpaulin would be quite satisfactory in this respect if there were some quick and effective way of fastening it neatly and smoothly in place. Such a fastening needs to be installed with material tension, so that the tarpaulin will be held snug and taut and will not flap around in the wind and be torn, or even torn away. The conditions of use also render it very desirable to have the fastening means reasonably immune to sabotage by dissatisfied employees or by mere mischief-makers.

To the best of my knowledge, it has been the universal custom in the past to use one or the other of two types of fastenings. One fastening is a rubber cord about 36" long and one half inch square, with metal hooks affixed at both ends. Such cords can be assembled by inserting the hook at one end in the conventional grommet in the edge of the tarpaulin and stretching the rubber band enough to hook the lower end hook to a bar or attachment hook on the body of the truck. These bands can be assembled in crossed pairs, with the bands diagonal, or separately with the bands vertical.

The other common equipment is a simple bit of small rope with one end tied through the grommet, and the used has to draw the rope snug and tie some sort of knot at the lower end. The ropes have a serious disadvantage that it takes a lot of time to adjust and tie them, and they have almost no elasticity to take care of shrinkage or expansion by yielding a little. Also, in bad weather, the knots become encrusted with sleet and then frozen, and unfastening them is a difficult and distasteful chore.

In putting a tarpaulin on with either type of equipment, is is customary to use a step ladder or scaffolding, so that a workmen can get up to the edge of the tarpaulin to fasten the upper parts on. Alternatively, the ropes or cords are permanently affixed to the tarpaulin and have to be rolled up with it, when the tarpaulin is not in use and must be stored. The presence of the ropes or bands and hooks, interferes with folding the tarpaulin into a neat package, and unless care is used, the hooks may tear the tarpaulin.

According to the invention, I provide a unitary assembly for association with an individual grommet in the edge of the tarpaulin, which can be assembled with the tarpaulin quickly, and frequently from a position on or near the ground level. Below the hook engaging the grommet, I provide resilient tension means and means for adjusting the length by small amounts over a wide range. At the bottom, I provide hook means for engaging the bars, hooks, or other projections provided on the truck body for the purpose. Because the entire assembly from top hook to bottom hook is of metal members of substantial thickness, sabotage by severance becomes a major undertaking.

By providing all the metal parts with a dipped neoprene outside coating, I secure two desirable results. First, if the parts of the hold-down happen to rub a little against the body of the truck, there will be no scratching or injury to a polished surface, or the like, which might readily occur if naked steel was laid against the truck body. The second advantage is that the rubber coating itself may be arranged, so that the expansion and contraction of the spring tension means will be materially damped by rubber to rubber friction.

In the accompanying drawings:

Figure 1 is a side elevation of a complete hold down;

Figure 2 is a side elevation with the same parts rotated 90° around a vertical axis;

Figure 3 is a view of the entire length adjustment plate with the bottom hook connected to it for minimum length;

Figure 4 is a side elevation of a substitute top hook of the right length for doubling the length range of convenient adjustment;

Figure 5 is a detail of the lower end of the bottom hook member viewed at an angle;

Figure 6 is a view as in section on line 6—6 of Figure 1;

Figure 7 is a view as in section on line 7—7 of Figure 1;

Figure 8 is a partial section on line 8—8 of Figure 6;

Figure 9 is a section on line 9—9 of Figure 8;

Figure 10 is a section on line 10—10 of Figure 7;

Figure 11 is a partly diagrammatic view of one of the twin tensors indicating the distortion of the tensor by inserting it into the spring; and Figure 12 is a fragmentary side elevation of a truck body and tarpaulin mounted thereon.

In the embodiment selected to illustrate the invention, which hold-down comprises four parts, the top reach 10, the tension spring unit 12, the adjustment plate 14, and the bottom rail 16.

The complete spring unit, or capsule, comprises only three elements. The helical compression spring 18 and two duplicate tensors, or draw bars, 20 and 22, one of which opens downwardly and one of which opens upwardly. The downwardly opening tensor 20 (see Figure 11) is in the form of a long, narrow clevis, and has an upper bight at 24, the inner surface of which has a radius of curvature approximately equal to or a little greater than the radius of curvature of the outer surface of the top reach 10. The top reach 10 is turned back on itself to form a bight 25 adapted to fit in the bight 24, and the reversely extending end portion 26 may be bent in a little to keep the parts in assembled relationship. Referring again to Figure 11, the legs of the tensor have open hooks 28 at the ends remote from the bight 24, and these hooks have a curvature adapted to receive the end coil 30 of the spring 18. However, the parts are originally formed with the hooks 28 in the dotted line position of Figure 11 when the tensor is in unstressed condition.

The entirety of the spring 18, and the entirety of the tensor is encased in a continuous sheath or integument 32 of neoprene, or the like. This may be done by a simple dipping process when the parts are entirely separate after which the neoprene surface is given a Hypolon treatment to harden it. Since this coating procedure is well known in the art and, per se, forms no part of the present invention, the disclosure herein is not encumbered with the details thereof.

It will be apparent that when the tensor is thrust into the spring, approximately the lower half or two thirds of each of its legs will be compelled to flex in to the full line position of Figure 11. This provides a gentle frictional grip for holding the parts in assembled position. More, subsequent contraction and elongation of the spring 18 will cause the individual turns of the spring that receive the outward pressure of the legs of the tensor to slide toward and away from each other, on these legs, and provide a material absorption of energy to prevent vibration.

The assembly of the complete unit must be done in a predetermined sequence, but it is otherwise extremely simple. The tensor 22 is threaded into the end hole 34 of the extension plate 14 by threading one of its end hooks 36 through the hole and sliding the extension plate up to the bight 38. Then the plate is passed through the spring and beyond, and the spring is pulled over the tensor to the relative positions indicated in Figure 11.

With the bight 38 projecting a half inch or so beyond the end of the spring 18, the other tensor 20 has one of its hooks 28 hooked around one leg of the tensor 22, and then rotated 180°, so that one leg of the tensor 20 lies between the legs of the other tensor 22. Then the tensor 20 is slid between the legs of the other tensor 22 until its bight 24 embraces one leg of the tensor 22. The tensor 20 can now be swung into a position in alignment with the spring 18 and its bight 24 slid into the spring and gently pushed through the spring until the bight 24 projects beyond the other end of the spring far enough to receive the end portion 26 of the reach 10. This end portion is inserted and turned 90° to the position of Figure 1 and bent over to close the opening.

Depending on the desired loading characteristics of the final assembly, it may, or may not, be necessary to compress the spring 18 a half inch or so to permit the bights of the tensors to project far enough to complete the assembly. In one successful embodiment for holding tarpaulins in place on trucks, the completed assembly is designed to require five pounds of tension before any elongation is permitted and to increase the tension at the rate of twenty-five pounds for each inch of elongation.

The extension plate 14, in assembled condition, is permanently retained by the tensor 22. As best illustrated in Figure 3, it may have a plurality of spaced receiving holes 40 uniformly spaced throughout its length. The bottom reach 16 carries an upper end hook comprising a U-shaped bight 42 and an end portion 44 extending back in parallelism with the main reach 16. It will be obvious that the reach can be slipped into any one of the holes 40, with the reach perpendicular to the plane of Figure 1, and rotated 90° either clockwise or counterclockwise to facilitate insertion of the hook into the hole. After insertion, the reach may swing into the plane of Fig. 1, and then down to the position of Figure 1, ready for use. As best indicated in Figure 3, I make the length of the reach 16 enough, so that with the top hook entered in the uppermost receiving hole 40, there is still room for the entire length of the plate 14 to lie in parallelism with the reach 16. In one successful embodiment for use on trucks, the amount of adjustment thus provided is about 13".

Since the variation in the heights of the truck bodies is more than 13", I provide a top reach 46 identical with the top reach 10, except that it is about 14" longer than the top reach 10. By this simple expedient, the adjustment range of the equipment is doubled.

At the lower end of the reach 16, I bend the metal downward and to the right as at 46, then vertically down at 48 and around and up again to define an upwardly opening hook 50. From the outer tip of the hook 50, the metal then extends horizontally at 52 over to the outer tip of a duplicate hook 54 and back up at 56 vertically, and then diagonally inward at 58 where the extreme end can be welded or otherwise affixed at 60 to the elbow between the reach 16 and the portion 46.

The shape of the terminal thus provided affords maximum convenience in engaging the terminal with a substantial variety of attachment means carried by the truck body. Many truck bodies are provided with horizontal bars 63, see Figure 12, and other truck bodies are provided with downwardly opening hook brackets 65. The shape shown readily engages either form of body bracket to secure reliable interlocking engagement.

Referring now more particularly to Figures 6, 7, 8, and 9, it will become apparent that the tensors 20 and 22 would tend to lie in planes perpendicular to each other if it were not for the presence of the bight 25 at one end and the plate 14 at the other end. The engagement between the bight 25 and the bight 24 normally tends to hold these two parts in planes at right angles to each other, but there is enough clearance to permit them to twist out of this relationship about 30°. As best indicated in Figure 8, this pulls the bight 25 down where it crowds hooks 36 out of a right-angled relationship with the bight 24 by about 30°.

At the bottom of the spring, the plate 14 is similarly articulated with the bight 38 to allow only about 30° difference from a right-angled relationship, and thus, the bottom hooks 28 are crowded 30° to one side. The result is, as best indicated in Figure 9, that the inner periphery of the spring 18 may be sub-divided into six equal parts, or sectors, of which two opposite portions are vacant, except at the ends where the plate 14 or the bight 25 occupy them. Accordingly, the entire length of each leg of each tensor rubs with appreciable friction against one of the adjacent legs of the other tensor and this provides an additional rubbing action that materially increases the damping of vibrations.

If the hole 34 in the extension plate 14 is substantially as indicated in Figure 3, the plate 14 will be substantially free to swing 90° in either direction around the bight 38 away from the position of Figure 1. In some conditions of use, it is desirable for the operator to be able to hold the lower end of the plate 14, and reach up to hook the top hook 62 and the reach 10 or the top hook 64 on the reach 46 into one of the grommets 66 (see Figure 12). In Figure 10, I have indicated a minor modification in which the plate 14' has a short extension 67 which normally extends up inside the spring 18 far enough to contact the turns of the spring and restrict the swinging movement of the plate to about 10° or 15° in either direction. This not only enables the user to grasp the lower end of the plate 14 and have the plate 14 and spring 18 and reach 10 stay in approximate alignment to facilitate reaching up to get at the grommet 66, but if it is desired to store the equipment with the parts in a more compact relationship, a slight withdrawal of the plate 14' to the dotted line position indicated in Figure 10 will cause the spring to engage the plate 14' gently on both sides of the hole 34 and hold the spring and extension plate approximately at right angles.

To facilitate assembly with the tarpaulin, the hooks 62 and 64 may have their tips curved out at 68 and 70, and the user can slip the hook between the tarpaulin and the truck body, and then turn it, so that the tip points out to enter the grommet.

Others may readily adapt the invention for use under various conditions of service by employing one or more of the novel features disclosed or equivalents thereof. The spring assembly by itself, comprising only the spring 18 and the two draw bars 20 and 22 can obviously be used in a wide variety of tension connections other than hold-downs for tarpaulins, or the like, and the effective protection of all the parts against wind and weather, as well as the shock absorbing action, make this unit of outstanding utility and cheapness in connection with equipment for mooring boats and for towing broken down vehicles and in guy ropes for tents, etc.

After prolonged service has worn away the rubber coating enough to expose bare metal, it is a simple matter to disassemble the spring capsule, remove the old coating by scraping, sand blast, or solvent, dip the parts to apply a brand new coating, and put them together again.

As at present advised, with respect to the apparent scope of my invention, I desire to claim the following subject matter:

1. A spring capsule comprising, in combination: a helical spring element having a plurality of coils; a tension draw bar extending axially through said spring from end to end; said draw bar having a first engagement means at one end for interlocking engagement with one end of said spring and a second engagement means at the other end for engagement with a tension member extending away from the spring; said draw bar and spring being of metal with a surface coating of rubber; said draw bar being transversely resilient with respect to the axis of said spring; portions of said draw bar pressing outwardly against the coils of said spring with sufficient force to absorb, during each excursion of the parts in either direction, a material fraction of the energy stored in the strain of said spring, or in the kinetic energy of the load.

2. A capsule according to claim 1 in which the turns of said helical spring are of uniform internal diameter throughout the working length of said spring.

3. A capsule according to claim 2 in which said second engagement means is a bight having two legs and opening axially back through said spring toward the opposite end.

4. A capsule according to claim 3 in which said bight and said legs are of resilient metal, and said legs, in undistorted condition, diverge laterally to a spacing greater than the space enclosed by said spring; said legs, in assembled condition, remaining under stress and pressing laterally outward in opposite directions against the individual coils of said spring.

5. A capsule according to claim 4 in which said first engagement means is a pair of hooks, one at the end of each of said resilient legs; said hooks opening axially back toward said bight and extending radially outward in opposite directions from the spring axis.

6. A capsule according to claim 5 in which said hooks are shaped to receive the end coil of said spring in fitting engagement, to deliver compression thrust to said end coil.

7. A capsule according to claim 4 in combination with a second duplicate draw bar inserted in said spring; the bight of said second draw bar lying at the end opposite the bight of said first draw bar.

8. A capsule according to claim 7; combined with tension connections articulated with each draw bar bight and shaped and adapted to crowd the adjacent engagement means of the other draw bar and force the leg of said other draw bar against the legs of the draw bar articulated with said tension means, to cause rubbing friction between said draw bar legs when the axial length of said spring is changed.

9. A combination according to claim 8 in which each of said bights, when said spring is of maximum length, holds its tension connection drawn at least partially between the adjacent engagement means of the other draw bar; said bight, said engagement means, and said tension connection each subtending sectors of predetermined extent about the spring axis; the combined total of all said sectors being slightly greater than 360°; whereby movement to the position of maximum spring length wedges said tension connections lightly between said bight and said engagement means; said rubber coatings yielding to cushion said wedging action and tending to impose light frictional resistance to changes in relative axial alignment.

References Cited in the file of this patent

UNITED STATES PATENTS

| | | |
|---|---|---|
| 1,936,389 | Hallquist | Nov. 21, 1933 |
| 1,972,346 | Juline | Sept. 4, 1934 |
| 2,403,145 | Ulrich | July 2, 1946 |

FOREIGN PATENTS

| | | |
|---|---|---|
| 18,289 | Switzerland | Nov. 30, 1898 |